US006955140B2

(12) United States Patent
Saarinen et al.

(10) Patent No.: US 6,955,140 B2
(45) Date of Patent: Oct. 18, 2005

(54) METHOD AND APPARATUS FOR INCREASING THE CAPACITY OF A WASTE HEAT BOILER IN A METALLURGIC SMELTING FURNACE

(75) Inventors: Risto Saarinen, Espoo (FI); Ilkka Kojo, Kirkkonummi (FI)

(73) Assignee: Outokumpu Technology Oy, Espoo (FI)

( * ) Notice: Subject to any disclaimer, the term of this patent is extended or adjusted under 35 U.S.C. 154(b) by 0 days.

(21) Appl. No.: 10/497,833

(22) PCT Filed: Dec. 3, 2002

(86) PCT No.: PCT/FI02/00973

§ 371 (c)(1), (2), (4) Date: Jun. 7, 2004

(87) PCT Pub. No.: WO03/050464

PCT Pub. Date: Jun. 19, 2003

(65) Prior Publication Data

US 2005/0051110 A1 Mar. 10, 2005

(30) Foreign Application Priority Data

Dec. 13, 2001 (FI) .......................................... 20012451

(51) Int. Cl.[7] .................................................. C21B 7/22

(52) U.S. Cl. ........................ 122/7 R; 266/147; 266/155

(58) Field of Search .......................... 122/7 R; 266/136, 266/147, 146, 155, 144

(56) References Cited

U.S. PATENT DOCUMENTS

| | | | | | |
|---|---|---|---|---|---|
| 4,469,493 | A | | 9/1984 | Tuovinen et al. | 55/89 |
| 4,530,311 | A | * | 7/1985 | Mantymaki | 122/7 R |
| 4,908,058 | A | | 3/1990 | Saarinen | 75/25 |
| 5,029,556 | A | | 7/1991 | Malmstrom et al. | 122/7 |
| 5,431,373 | A | | 7/1995 | Lilja et al. | 266/44 |
| 5,505,434 | A | * | 4/1996 | Lilja et al. | 266/44 |
| 6,180,078 | B1 | * | 1/2001 | Poijarvi et al. | 423/540 |
| 6,228,144 | B1 | | 5/2001 | Shirasawa et al. | 75/641 |
| 6,547,848 | B1 | * | 4/2003 | Jalonen et al. | 75/414 |

FOREIGN PATENT DOCUMENTS

DE WO 00/73724 12/2000 ........... F27D/17/00

* cited by examiner

*Primary Examiner*—Gregory Wilson
(74) *Attorney, Agent, or Firm*—Morgan & Finnegan, L.L.P.

(57) ABSTRACT

The invention relates to a method for increasing the capacity of a waste-heat boiler (1) processing gases obtained from a metallurgic smelting furnace, such as a flash smelting furnace, and for reducing dust accretions, where liquid is added into the waste-heat boiler (1) of the smelting furnace. The invention also relates to an apparatus for increasing the capacity of a waste-heat boiler (1) processing gases obtained from a metallurgic smelting furnace, such as a flash smelting furnace, and for reducing dust accretions, in which case the waste-heat boiler is provided with at least one nozzle (2) for adding liquid.

5 Claims, 2 Drawing Sheets

Figure 1:
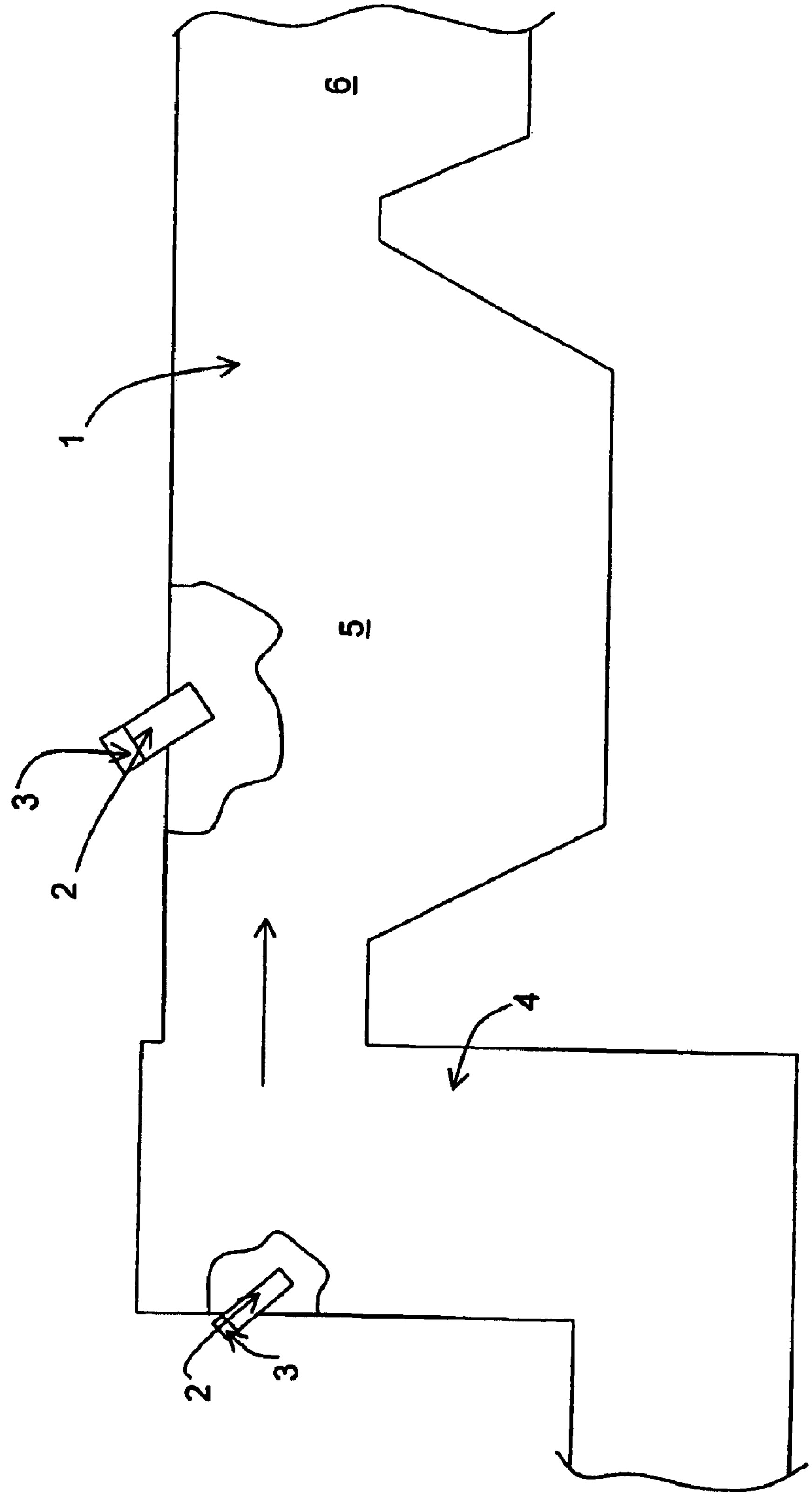

METHOD AND APPARATUS FOR INCREASING THE CAPACITY OF A WASTE HEAT BOILER IN A METALLURGIC SMELTING FURNACE

The invention relates to the method and apparatus defined in the preambles of the independent claims for increasing the capacity of a waste-heat boiler processing gases obtained from a metallurgic smelting furnace, such as a flash smelting furnace, and for decreasing dust accretions.

In succession to a metallurgic smelting furnace, the employed waste-heat boiler is generally a so-called tunnel-type boiler operated with a direct gas flow, said boiler being divided into two parts, a radiation chamber and a convection chamber. The purpose of the radiation chamber is to cool the gases so that the molten particles contained in the gas are solidified and the temperature decreases to under the particle sintering temperature before the gases are conducted into the convection chamber of the waste-heat boiler. In the convection chamber, the final heat contained by the dust-bearing gases is recovered by a cooling pipework.

When planning a metallurgic smelting process, such as a flash smelting process, it is naturally desirable to minimize investment costs. Owing to the dust content of the exhaust gases, waste-heat boilers connected to metallurgic smelting may contain dust accretions, which may affect both the operation of the waste-heat boiler and the smelting process itself. These difficulties may result in possible interruptions in the process, which cut the production and become fairly expensive. The problems causing dust accretions occur mainly in the following ways: convection cooling packages are blocked in the convection chamber of the waste-heat boiler, the pipe between the waste-heat boiler and the electric filter connected thereto is blocked, or accretions are formed on the emission electrodes of the electric filter. In the accretions, there has been found copper sulfate $CuSO_4$, which means that the sulfatizing of dust is connected to the creation of accretions. When the copper oxide contained in the dust reacts with oxygen and sulfur dioxide, copper sulfate is created.

Often the limit for the capacity of a smelting furnace is the capacity of the waste-heat boiler connected to the process for sufficiently reducing the gas temperature, i.e. the capacity of the chamber of the waste-heat boiler. To increase the capacity of a prior art waste-heat boiler by extending the radiation chamber is a relatively large investment and requires a long interruption in smelting in order to be realized. The temperature before the convection chamber must be set sufficiently low, in order to make the sulfatizing reactions that are important for the process to take place exactly in the radiation chamber of the waste-heat boiler. If there is a chance that reactions also take place in the convection chamber, the result is that the dust is more easily attached to the heat transfer surfaces, and in the worst case the whole gas line is throttled and finally blocked due to the accretions.

According to the prior art, the described problem is controlled by blowing in the boiler and/or in the uptake shaft so-called sulfatizing air and/or circulation gas, so that the desired reactions take place. According to the patent FI 74,738, the creation of accretions is adjusted by blowing oxygenous gas into the radiation chamber. The sulfatizing reactions are made to take place earlier, in the radiation chamber, by adding in the radiation chamber some oxygenous gas, such as air. Then the in-blown gas lowers the temperature of the gas contained in the radiation chamber and the reaction area is shifted to the radiation chamber, where the reactions take place in the dust particles prevailing in the gas phase so that dust accretions are not created. However, by using said method it is not possible to increase the boiler capacity, because the heat amount bound to the circulating gas and air must be recovered in the convection chamber. Moreover, if too much air is blown in, there is the drawback that when the partial pressure of oxygen is increased, there is the danger that the sulfur dioxide is in the reaction converted into sulfur trioxide, thus causing corrosion problems and an increased creation of unnecessary weak acid in the washing section of the gas line.

The object of the invention is to introduce a new method and apparatus for increasing the capacity of a waste-heat boiler in a metallurgic smelting furnace, such as a flash smelting furnace. In particular, the object of the invention is to increase the capacity of the waste-heat boiler, so that into the radiation chamber of the waste-heat boiler, advantageously into the first end thereof, there is injected liquid, such as water, whereby the temperature of the radiation chamber—and simultaneously the reactions taking place in the radiation chamber—are controlled. In addition, when necessary, liquid is also added into the smelting furnace, for instance into the uptake shaft of a flash smelting furnace.

The invention is characterized by what is set forth in the characterizing parts of the independent claims. The other preferred embodiments of the invention are characterized by what is set forth in the other claims.

Remarkable advantages are achieved by using the method according to the invention. According to the invention, in order to increase the capacity of a waste-heat boiler processing the gases obtained from a metallurgic smelting furnace, such as a flash smelting furnace, an Isasmelt, Ausmelt or Norsmelt reactor, and in order to reduce dust accretions, into the waste-heat boiler there is added liquid, such as water. The task of the injected water is to lower the temperature of the gas exhausted from the furnace, efficiently down to a desired range, so that the heat amount bound by water spraying does not have to be removed completely from the gas in the convection chamber. Part of the liquid can be replaced by air, in which case the task of the oxygen contained in the air is to ensure that the sulfatizing reactions take place in the convection chamber in particular. The capacity of the waste-heat boiler of a metallurgic smelting furnace can be increased by a small investment in a gas/liquid/injection arrangement, in addition to which the convection chamber may need a small extension. The total capacity of the boiler grows in proportion to the heat amount consumed in evaporating the water and heating the boiler up to the exhaust temperature. Advantageously the sulfatizing reactions in the boiler are made to take place in the radiation chamber, and the gas line is prevented from being blocked. Moreover, the liquid/gas mixture can be injected to the furnace uptake shaft, from where the gases proceed to the waste-heat boiler. Liquid is added by placing a required number of nozzles onto the roof or the wall of the radiation chamber of the waste-heat boiler, and possibly also to the wall of the uptake shaft, or in that part of the smelting reactor from where the gases proceed into the waste-heat boiler. The size, orientation angle and position of the nozzle can be adjusted. Through the nozzles, liquid is injected either as continuous streams or possibly so that one of the nozles is out of use. The quantity of liquid is controlled according to the incoming gas quantity.

The invention is described in more detail below with reference the appended drawings.

FIG. 1. An apparatus according to a preferred embodiment of the invention

Figure 2:
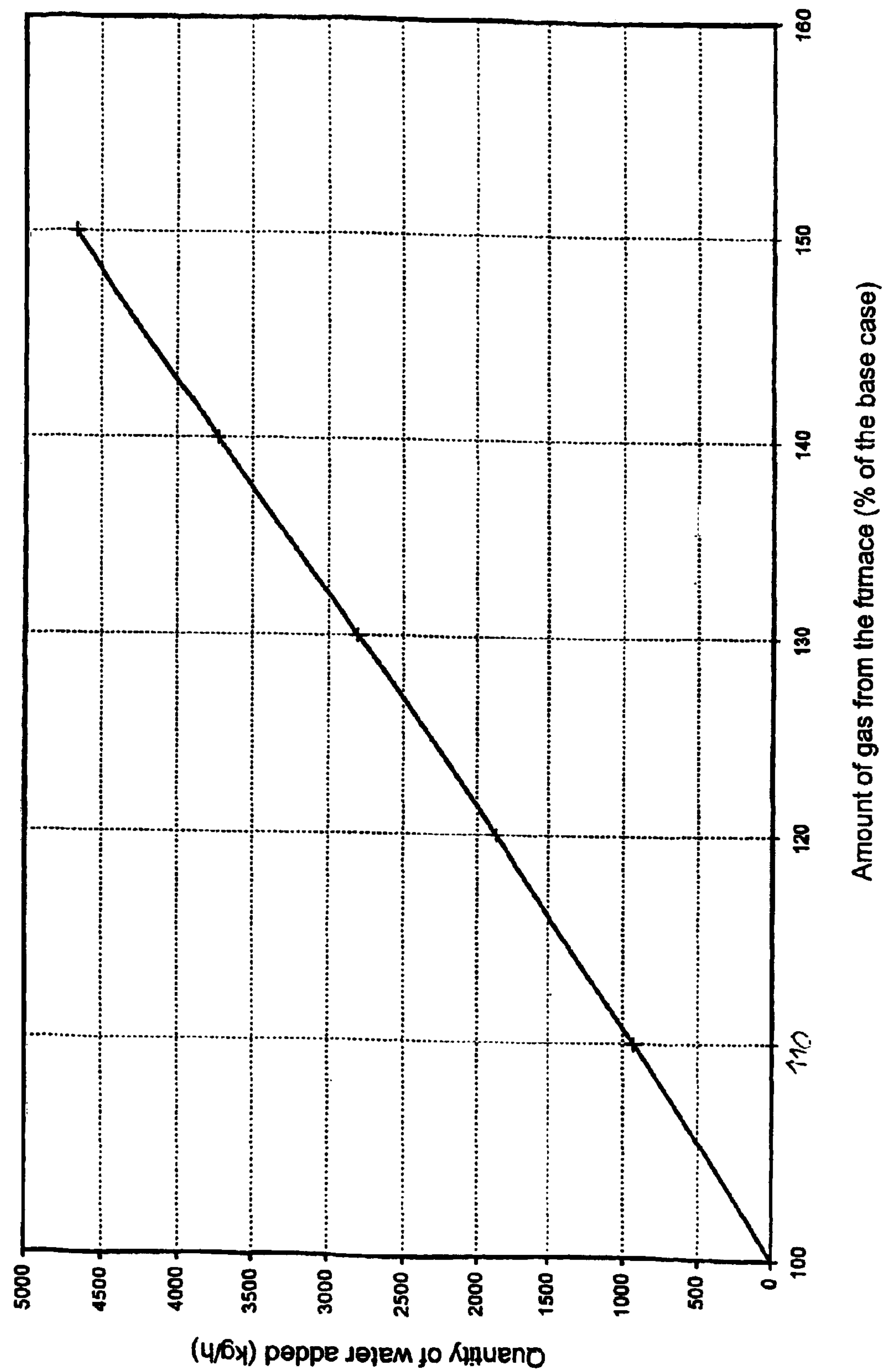

FIG. 2. A graph of the quantity of water to be added, in proportion to the quantity of gas.

According to FIG. 1, on the roof of the waste-heat boiler 1 and in the uptake shaft 4 of the flash smelting furnace, there are placed nozzles 2. The roof of the waste-heat boiler 1 comprises a hole, through which, via a blowing pipe 3 connected to the nozzle, the liquid/air mixture is injected to the radiation chamber 5 or the waste-heat boiler 1. The nozzle 2 is placed in an essentially inclined position with respect to the gas flow entering from the smelting furnace to the radiation chamber 5. The drawing also illustrates the convection chamber of the waste-heat boiler, in which the gases flow from the radiation chamber 5. A similar nozzle can also be used when adding liquid to the uptake shaft 4. When necessary, there can be several nozzles, and only one part of them can be simultaneously in operation.

An example of a preferred embodiment of the method and apparatus according to the invention.

EXAMPLE 1

According to the example, the quantity of gas obtained from the flash smelting furnace is 30 000 $Nm^3/h$, with the following contents:

| | Content | Quantity ($Nm^3/h$) | Temperature (° C.) |
|---|---|---|---|
| $SO_2$ (g) | 48 | 14,342 | 1,350 |
| $H_2O$ (g) | 3 | 850 | 1,350 |
| $CO_2$ (g) | 3 | 1,012 | 1,350 |
| $O_2$ (g) | 2 | 673 | 1,350 |
| $N_2$ (g) | 44 | 13,123 | 1,350 |

Into the waste-heat boiler, there is added 7,000 $Nm^3/h$ sulfatizing air with the temperature of 25° C. and the composition of 1,470 $Nm^3/h$ $O_2$ (g) and 5,530 $Nm^3/h$ $N_2$ (g). Let us assume that the gas does not contain dust. In addition, let us assume that the temperature of the radiation chamber of the boiler is, in order to secure a perfect operation, lowered down to the temperature 750° C., and that on the other hand, the final temperature in the boiler after the convection chamber must not surpass the temperature 420° C. due to the materials of the next electric filter. According to the example, when the capacity of the boiler should be increased, the required quantity of water to be injected into the boiler and the uptake shaft is illustrated in FIG. 2. In that case, when raising the quantity of gas, the final temperature of the radiation chamber of the boiler is still 750° C. Now the increased heat amount is bound by vaporizing the water and by heating the created vapor.

For a man skilled in the art, it is apparent that the various preferred embodiments of the invention are not restricted to the above explained examples only, but may vary within the scope of the appended claims.

What is claimed is:

1. A method for increasing the capacity of a waste-heat boiler processing gases obtained from a metallurgic smelting furnace, the waste heat boiler having a radiation chamber and a convection chamber, and for reducing dust accretions, comprising increasing the quantity of gas entering the waste-heat boiler, adding liquid into the radiation chamber of the waste-heat boiler of the smelting furnace and controlling the quantity of liquid flow according to the incoming gas quantity so that the gas temperature in the waste-heat boiler after the convection chamber does not surpass 420° C.

2. A method according to claim 1, wherein liquid is also added into an uptake shaft of the metallurgic smelting furnace.

3. A method according to claim 1 wherein part of the liquid is replaced by air.

4. A method according to claim 1 wherein the liquid is water.

5. A method according to claims 1, wherein liquid is added by at least one nozzle.

* * * * *